United States Patent [19]

Messina

[11] Patent Number: 4,461,436

[45] Date of Patent: Jul. 24, 1984

[54] GYRO STABILIZED FLYING SAUCER MODEL

[76] Inventor: Gene Messina, 12 Buccaneer La., E. Setauket, N.Y. 11733

[21] Appl. No.: 332,954

[22] Filed: Dec. 21, 1981

Related U.S. Application Data

[63] Continuation-in-part of Ser. No. 097,432, Nov. 26, 1979, abandoned.

[51] Int. Cl.³ .................. B64C 27/82; B64C 39/06
[52] U.S. Cl. .................. 244/23 C; 244/17.19; 446/37; 416/37; 416/128
[58] Field of Search ............ 244/12.1, 12.2, 12.4, 244/12.5, 23 C, 23 D, 120, 17.19, 80, 93; 46/74 D, 75; 416/128; D12/325, 326, 327, 330; D21/85, 86

[56] References Cited

U.S. PATENT DOCUMENTS

| | | | |
|---|---|---|---|
| 1,364,580 | 1/1921 | Petres | 416/128 |
| 2,728,537 | 12/1955 | Elkins | 244/23 C |
| 2,777,649 | 1/1957 | Williams | 244/23 C |
| 2,863,621 | 12/1958 | Davis | 244/23 C |
| 2,936,137 | 5/1960 | Kleminsky | 244/93 |
| 2,953,320 | 9/1960 | Parry | 244/12.2 |
| 2,980,365 | 4/1961 | Yohe | 244/23 C |
| 3,034,747 | 5/1962 | Lent | 244/23 C |
| 3,054,578 | 9/1962 | Brocard | 244/23 C |
| 3,456,902 | 7/1969 | Visconti | 244/23 C |
| 3,477,168 | 11/1969 | Trodglen, Jr. | 46/75 |
| 3,489,374 | 1/1970 | Morcom | 244/12.2 |
| 3,510,087 | 5/1970 | Strickland | 244/17.19 |
| 3,514,053 | 5/1970 | McGuinness | 244/23 C |
| 3,568,358 | 3/1971 | Bruce | 244/23 C |
| 3,831,884 | 8/1974 | Schellin | 244/23 C |
| 4,148,450 | 4/1979 | Neuhierl | 244/120 |
| 4,273,302 | 6/1981 | Jordan | 244/23 C |
| 4,307,856 | 12/1981 | Walker | 244/23 C |
| 4,387,867 | 6/1983 | Jordan | 244/23 C |

FOREIGN PATENT DOCUMENTS

| | | | |
|---|---|---|---|
| 267774 | 3/1927 | United Kingdom | 416/128 |
| 773650 | 5/1957 | United Kingdom | 244/23 C |

Primary Examiner—Galen L. Barefoot
Attorney, Agent, or Firm—Kevin Redmond

[57] ABSTRACT

A model having a flying saucer shaped body which is provided with lift by means of a thrust producing device such as a reciprocating Wankel or turbine engine and a propeller. The body is prevented from rotating by means of counterrotational fins, and stability in the horizontal plane is provided by means of an internal gyro rotor actuated by the airflow from the propeller.

5 Claims, 17 Drawing Figures

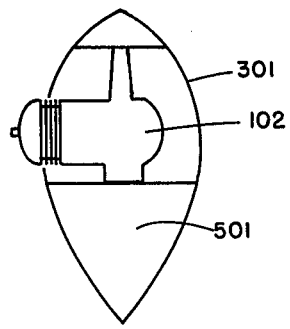
Fig.5
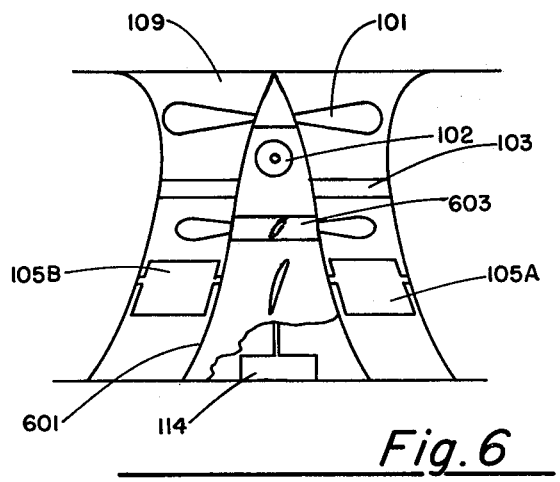
Fig.6
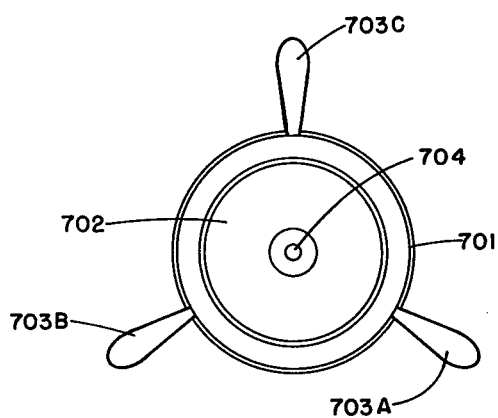
Fig.7
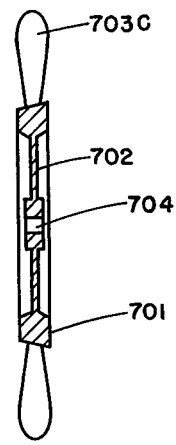
Fig.8
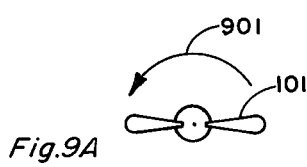
Fig.9A
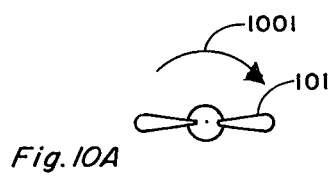
Fig.10A
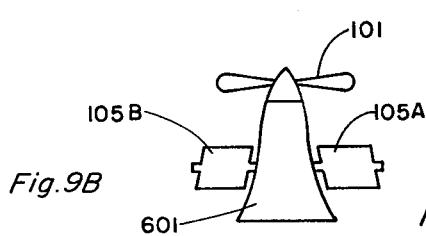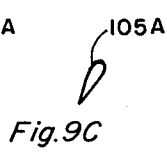
Fig.9B  Fig.9C
Fig.9
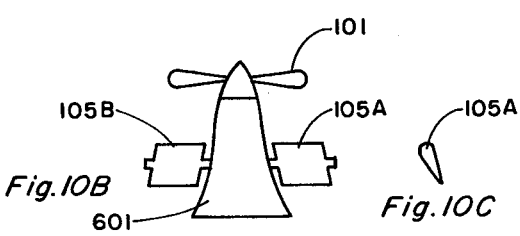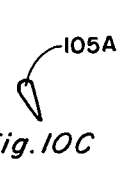
Fig.10B  Fig.10C
Fig.10

GYRO STABILIZED FLYING SAUCER MODEL

This is a continuation-in-part of application Ser. No. 097432 of the same title, filed on Nov. 26, 1979, now abandoned.

BACKGROUND

1. Field

This invention relates to a method of providing horizontal stabilization of airborne craft and, in particular, the stabilization of a nonrotating flying saucer model.

2. Prior Art

In various types of prior art vertical takeoff models, the counterrotational torque produced by the propellers or helicopter blades tends to cause the body of such a raft to rotate. This rotation is usually overcome in conventional helicopters by means of a second vertically oriented propeller located at one end of the body or, alternatively, by a counterrotating overhead blade.

Model helicopters in the form of flying saucers have employed fins to enhance the rotation of the body. Such rotation provides a gyroscopic effect which tends to stabilize the craft, preventing it from veering off to one side and crashing; however, the rotation of the body is unsatisfactory in providing the static body position normally desired for a helicopter model or certain flying saucer models.

SUMMARY

In the present invention, rotation of the body is completely avoided by means of counterrotational fins which are located beneath a thrust producing device, such as a propeller. Stability is provided by an internal gyro rotor containing fin-like spokes which drive the rotor when placed in the airflow from the propeller. Stability is further enhanced by the use of a weighted stabilizing tail member.

BRIEF DESCRIPTION OF THE DRAWINGS

FIG. 5 is a cross sectional view of the engine and control compartments of the embodiment of FIG. 3.

FIG. 6 is a cross sectional view of a third embodiment of the invention.

FIG. 7 is a plan view of an alternate rotor for the embodiment of FIG. 6.

FIG. 8 is a side view of the rotor of FIG. 7.

FIGS. 9A, B, and C shows the position of counterrotational fins for the counter clockwise rotation of the propeller.

FIGS. 10A, B, and C show the position of the counterrotational fins for the clockwise rotation of the propeller.

DETAILED DESCRIPTION OF THE INVENTION

Figure 1:
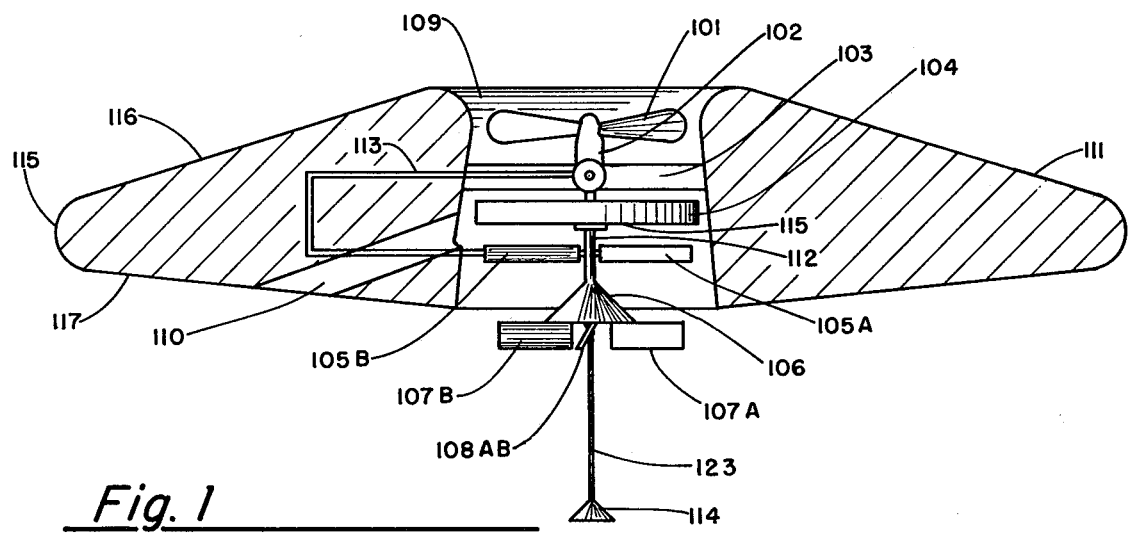
FIG. 1 is a cross sectional view of a first embodiment of the present invention.

In FIG. 1, a body 111 supports within a first passageway 109 a bracket 103 on which is secured an engine 102. The engine drives a horizontally oriented propeller 101. A shaft 112 is connected to the bracket beneath the engine. This shaft serves as a mounting support for a gyro rotor 104, counterrotational fins 105A and 105B, a deflection cone 106, rudders 107 and 108, spar 123 and weight 114. The rotor may be provided with bearing means, such as ball bearings (not shown), to facilitate rotation of the rotor on the shaft. The engine throttle control is connected to the counterrotational fins by means of linkage 113. Alternatively, the counterrotational fins may be oriented by an electrical driven gyro, not shown. A second passageway 110 connects the first passageway 109 to an area on the lower side of the body away from the center.

Figure 2:
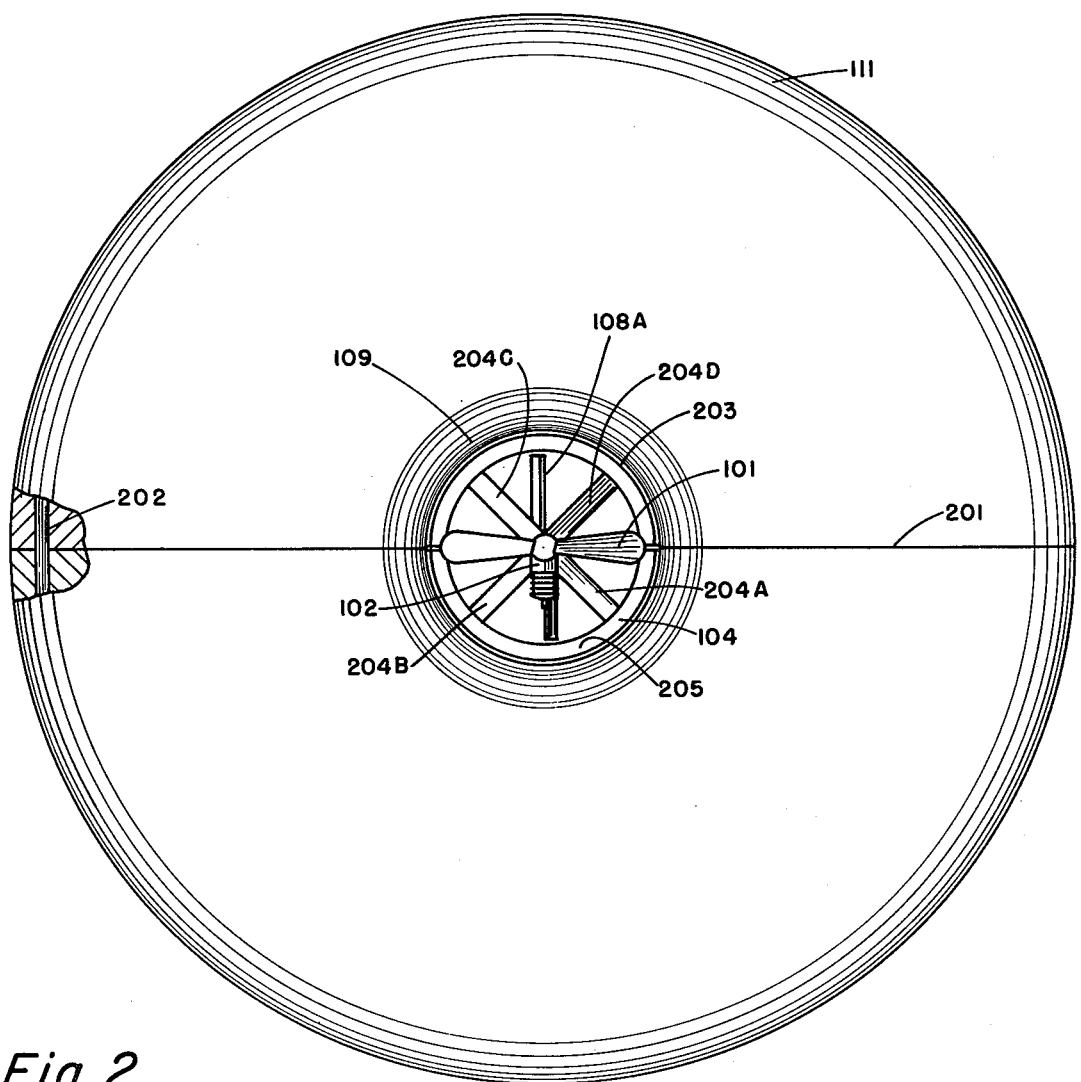
FIG. 2 is a top view of the embodiment of FIG. 1.

FIG. 2 is a top view of the device of FIG. 1 showing the rotor 104 as comprising a rim 205 with fin shaped spokes 204A through 204D. The spokes are connected to a hub 118 shown in FIG. 1. The hub is rotatably mounted on the shaft 112. The rotor may be provided with some form of bearing means, such as ball bearings, not shown, to facilitate rotation of the rotor about the shaft.

Returning to FIG. 1, it can be seen that beneath the counterrotating fins on the shaft 112 is a diffusion cone 106. On the lower side of the diffusion cone are rudder blades 107A and 107B and spar 123 which extends directly below the craft. At the lower end of the spar is weight 114.

In the operation of the first embodiment of the invention shown in FIGS. 1 and 2, the propeller provides sufficient thrust to cause the craft to hover or climb. The airflow from the propeller impinges on the fin-shaped spokes 204 causing the gyro rotor to revolve and thus stabilize the craft. Prior art devices either tended to tip and then crash or the craft itself had to rotate for stabilization, detracting from the realism of the model. The present invention is also more practical for larger craft because it eliminates the need for rotation of the body.

Beneath the gyro rotor 104 are counterrotational fins 105A and 105B which are set at an angle to provide sufficient counterrotational force when the propeller thrust impinges on them to maintain the craft stationary. The linkage 113 increases the pitch of these fins as the engine throttle is advanced to prevent rotation over a wide range of throttle settings. Alternatively these fins may be driven from a separate gyro sensor which is designed to sense rotation of the body of the craft. Any rotation will result in a corrective pitch for the counterrotational fins.

The counterrotational fins may have an airfoil cross section to provide additional lift. The cross section of the counterrotational fins are shown in greater detail in FIGS. 9 and 10. FIG. 9A shows a top plan view of the propeller 101 and streamlined container 601. The propeller is shown rotating in a counterclockwise direction by means of directional arrow 901. FIG. 9B is a front elevation view of the container 601 and the counterrotational fins 105A and 105B. FIG. 9C is a side elevational view of the counterrotational fin 105A showing its orientation for the counterclockwise direction of rotation for the propeller. FIG. 9C also shows the airfoil cross section of the counterrotational fins. FIG. 10 is identical to FIG. 9 in all views with the exception that the direction of rotation 1001 of the propeller 101 is clockwise and the orientation of fin 105A is opposite that in FIG. 9 to provide the proper counterrotational torque for the different direction of the propeller.

Returning now to FIG. 1, the deflection cone 106 cause the air flow emitted from the lower side of the passageway 109 to have a lateral component which uniformly diffuse the flow over a wide area. The purpose of this diffusion is to improve the horizontal stability of the craft over that which would be obtained from a narrow discharge from the passageway 109.

The rudders 107 and 108 are used to propel the craft laterally. There are four rudder blades, but they function in pairs. For example, blades 107A and B form one pair that are pitched in one direction with respect to the aircraft. As the air flow emitted from the passageway 109 impinges on this pair, it will tip the craft in one direction causing a component of the airflow to have a nonuniform lateral direction. The second pair of rudders 108A and B act in a similar manner, but they are orthogonal with respect to the first pair to provide in combination with the first pair lateral thrust in any chosen direction depending on the relative pitch of each set of rudders. It can be seen in FIG. 1 that only rudder 108B is visible, as 108A is covered; however, 108A and B are identical in form to 107A and B except for their horizontal positioning.

The spar 123 and the weight 114 comprise an alternative or supplementary means of horizontal stabilization. Whenever the craft leaves the horizontal plane, the weight and spar which are normally extended directly below the center of the craft, provide a counteracting force to restore the craft to the horizontal plane. Conversely, the spar and weight may be offset at some small angle from their usual directly downward position to provide a force which will tip the craft and thereby provide an alternative means of providing lateral motion. Excessive tipping which could lead to a crash is avoided by this method because the weight and spar provide a corrective force whenever the craft tips beyond that set by the offset angle of the weight and spar.

As can be seen from FIG. 2, the body of the craft is divided in two along a seam 201. The body may be disassembled into two parts to facilitate transportation. The two halves are held together by dowels and fasteners along the seam line as illustrated by fastener 202 shown through a broken away portion of the surface of the craft in FIG. 2.

The second passageway 110 is designed to divert a portion of the airflow from the first passageway 109 and discharge it away from the center of the craft with a lateral component. The discharge from the second passageway on the lower side of the craft tends to raise the left side placing the second passageway in a more horizontal position which further enhances the lateral thrust produced by this means.

In FIG. 1, it can be seen that the edge of the body 115 is rounded rather than being sharp or pointed, and this rounded edge along with the contour of the upper surface 116 and the lower surface 117 form an airfoil which tends to provide lift when the craft is traveling in the lateral direction. The rounded tip also prevents diving usually occurring in prior art designs, where the sharp edges of the body acts to increase the tip angle as the craft moves laterally.

Figure 3:
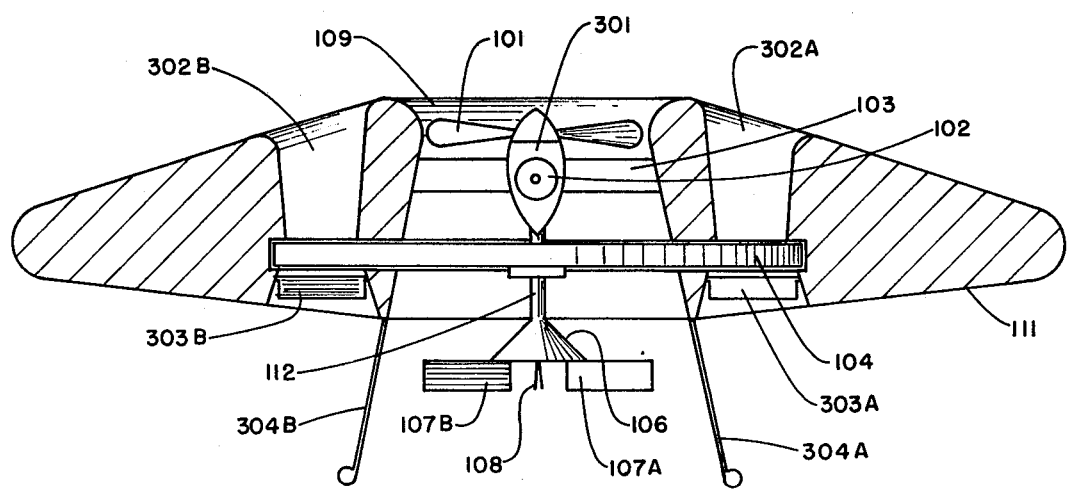
FIG. 3 is a cross sectional view of a second embodiment of the present invention.

FIG. 3 shows an alternative embodiment of the invention in which there are two vertical passageways 302A and B in addition to the centrally located passageway 109. The components in the centrally located passageway are similar to that shown in FIG. 1; however, the rotor is larger, extending beyond the centrally located passageway and past the two symmetrically displaced and smaller passageways 302A and B. In addition, the counterrotating fins 303A and B are respectively located in the smaller passageways 302A and B. The craft is supported on a landing gear 304A and B, formed of wire and positioned beneath the body of the craft.

Figure 4:
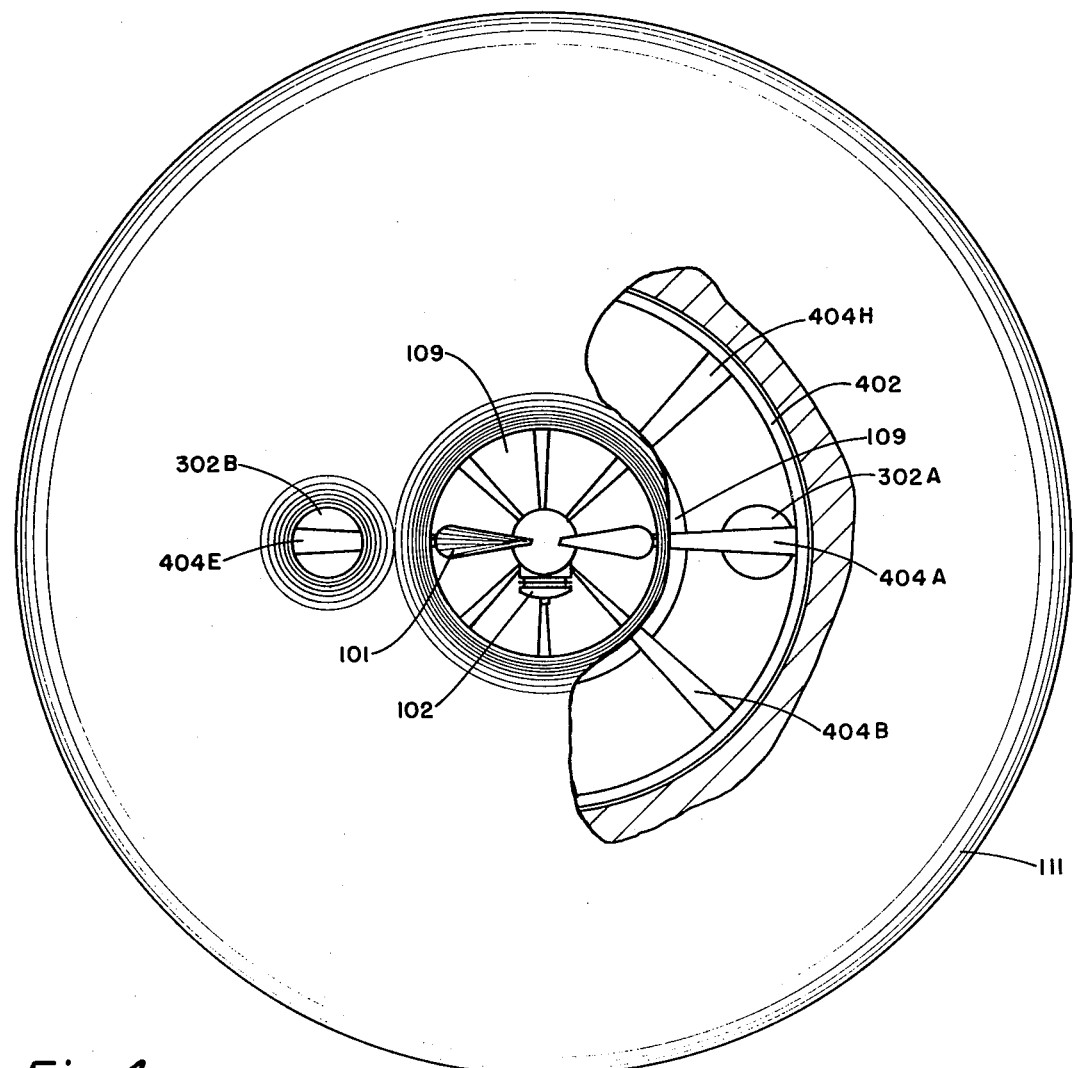
FIG. 4 is a top view of the embodiment of FIG. 3.

FIG. 4 shows that the fin shaped spokes 404A and E of the rotor extend from the central passageway 109 through the smaller passageways 302A and B before they are connected to the rotor rim 402.

FIG. 5 shows the engine 102 enclosed in a streamlined container 301, except for a protrusion of the engine such as the cylinder head. The lower portion of the container 301 contains a compartment 501 to accommodate ratio control equipment. The radio control equipment may use the landing gear 304 of the spar 123 as an antenna.

The central passageway in the crafts shown in FIGS. 1 and 3 both neck in at the propeller to form the contours of a ducted fan and to increase the efficiency of the propeller.

The operation of the craft shown in FIG. 3 is similar to that of FIG. 1 except for the larger gyro rotor, the additional vertical passageways and the location of the counterrotational fins. The rotor in FIG. 3 is again made to rotate by the downward airflow from the propeller on the fin-shaped spokes of the rotor. Once the rotor has begun to rotate, the fin-shaped spokes produce a down draft in the smaller passageways 302A and B. This downward draft impinges on the counterrotational fins 303A and B preventing the craft from rotating. The advantage of this arrangement is the rotor hub can be made lighter because of its greater distance from the center and its greater inertia. The lighter rotor can still provide the stability of a smaller diameter, but heavier rotor. This reduction in weight provides significant advantages in lifting and lateral speeds of the craft.

The location of the counterrotational fins at a greater distance from the center of the craft increases the torque that they can provide in preventing rotation of the craft. Consequently smaller fins can be used which reduce the impediment to the downward flow, thus increasing the lift.

FIG. 6 shows a variation 601 of the streamlined container of FIG. 3. In this design, the lower portion of the body is flared outward to run generally parallel to the outer contour of the passageway 109.

The weight 114 in FIG. 6 has been moved in the lower portion of the body. The weight in this case could be the battery used for radio control.

The weight can be used for stabilization or alternatively it may be moved off center to propel the craft laterally. For stabilization, a sensing device, such as a mercury contact switch with a plurality of contacts to indicate the direction of tipping, can be used to drive a servo system which will move the weight to compensate for the tipping and thereby stabilize the craft. The servo system can be used in a similar manner to drive the rudders for the same purpose.

It is important to center the fuel tank in the body so that as the fuel is used, it does not produce a weight offset that drives the craft laterally.

FIG. 6 also illustrates an alternate gyrorotor configuration 603. This configuration is illustrated in more detail in FIG. 7. In this Figure, the gyrorotor is shown to comprise a rim 701, a body 702 which contains a central opening 704 to accept a shaft. About the periphery of the rotor 701, are propeller blades 703A through 703C which are driven by the downward flow from the propeller 101 in a manner similar to that of the fin shaped spokes of the rotor 104.

FIG. 8 illustrates the heavier outer rim 701 of the rotor. The advantage of this configuration is it is safer and easier to manufacture. It is safer because the body 707 is a solid member which is not divided up into fins and is therefore stronger. As a single piece device, it can be formed more easily. The blades can be standard nylon blades and therefore the intricate machining or casting required for the rotor fin blades is eliminated.

Figure 11:
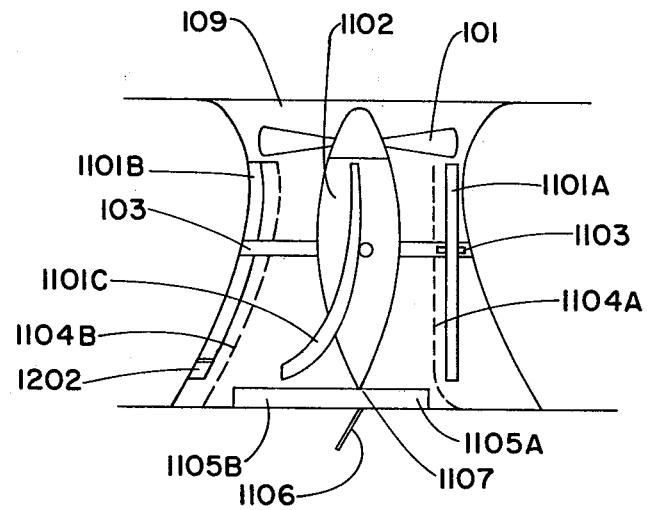
FIG. 11 is a cross sectional view of a forth embodiment of the invention.

FIG. 11 shows a forth embodiment of the invention in a cross sectional view which is similar to that shown in FIG. 6. The components shown in this view include a propeller 109, an engine compartment 1102, first, second and third counter torque tubes 1101 A, B, and C, the bracket 103, counter torque tube pivots 1103 A and B, channel separators 1104 A and B, and gyro 1105.

Figures 12A, 12B:
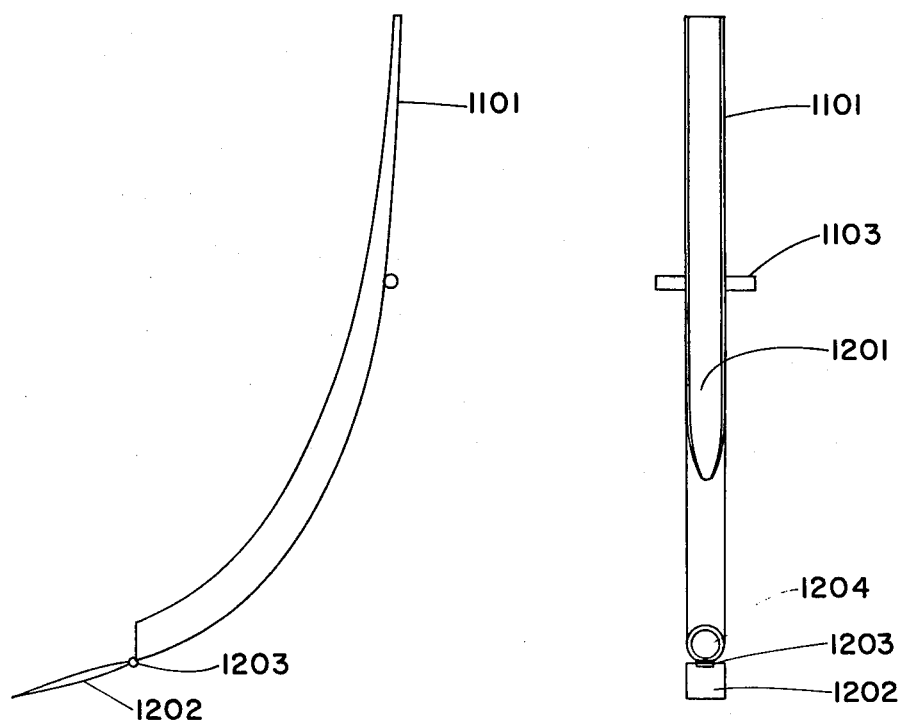
FIGS. 12A and B are a front and side elevational view respectively of the counter torque tube used in FIG. 11.

FIGS. 12A and B show the counter torque tube 1101 in greater detail. The elements of the counter torque tube shown in this Figure include an open face portion 1201, an exhaust port 1204, fine torque adjustment fin 1202, and pivot 1203 for the fine torque adjustment fin.

In this embodiment of the invention, the counter torque tubes are substituted for the counter rotational fins 105 A, B, C, and D described previously. Although only three counter torque tubes are shown in FIG. 11, four are usually employed. The forth tube, designated 1101 D is positioned on the opposite side of the engine compartment from tube 1101 C. These tubes are typically connected to a bracket, such as bracket 103, by a pivot means 1103 to permit the angle of the tubes to be changed in order to adjust the amount of counter torque produced.

In the operation of the tubes, the downward flow of air impinges on the open face portion of the tubes where it is captured and directed through the tube to the exhaust port 1204. The tubes have a curvature such that the exhaust flow is generally orthogonal to the down flow from the propeller. The exhaust ports are directed to produce a torque which is counter to that produced by the engine and propeller, permitting the body of the craft to remain stationary. The tubes are pivoted about pivot points 1103 to adjust the direction of the exhaust and thus the amount of counter torque. Fine adjustment of the counter torque is made by pivoting the fins 1202 which also direct the exhaust, but to a lesser degree than can be achieved by pivoting the tubes.

There is a distinct advantage the tubes have over the fins which has been demonstrated in dynamic tests where the tube proved to produce less disturbance to the downward flow and consequently less loss in downward thrust. A further improvement providing even less disturbance is achieved through the use of the channel separator 1105A which is a cylindrical thin walled device designed to isolate the disturbance of the tubes from the principal downward thrust in the passageway 109. The best results are produced by channel separators of the type shown on the left side of FIG. 11. In this design, the tube 1101B is placed directly against the passageway wall while the separator 1104B is placed against the tube to produce the least obstruction and thus resistance to the main flow through the passageway. The counter torque tube in this design cannot be pivoted because it is attached to the passageway wall. This requires the total adjustment of counterrotational torque to be made by means of the adjustment fins 1202. However, this design does permit a larger gyro to placed in the passageway as is shown by the larger radius of the left half as compared to the right half of the gyro (1105B as compared to 1105A). The right half is confined by the vertical type of separator 1104 illustrated on the right of this Figure. It should be understood that either one separator or the other will be used and that a symetrical gyro with equal radii in all directions will be used. Both designs are shown in one Figure merely for ease of comparison and simplicity of illustration.

The design of FIG. 11 provides another reduction in the resistance to the down flow within the passageway through the use of a single rudder 1106, which is shown in cross section in this Figure. The rudder is a single planar device that extends radially across the passageway 109 and is pivoted about point 1107 to tip the craft; however, the rudder is also rotated about a vertical axis extending through the center of the passageway 109 to permit tipping and thus steering the craft in any direction. The single rudder accomplishes the same function as the four rudder blades 107A and B, and 108A and B of FIG. 1 without the accompanying impediment to the flow caused by the relative large number of blades of FIG. 1.

Finally, the rudders may be eliminated entirely by gimballing the engine within the passageway and tipping it to provide a component of thrust which will propel the craft laterally. In such an arrangement the tubes are lowered in the passageway to provide clearance for the tips of the propeller blades as the engine is rotated about a point, as for example the axis of pivot 1103B, which would propel the craft to the left or right from the position shown in this Figure.

Alternatives which form a part of this invention are the substitution of a turbine, Wankel, jet or rocket engine for the propeller driven engine. With the latter two it is possible to eliminate the counterrotational fins. The counterrotational fins are not needed with such engines because they produce no rotational torque.

Rather than place a single engine in the central passageway, pairs of engines may be placed in the smaller passageways. Each engine in a pair will tend to counteract the others rotational torque, reducing or eliminating the need for counterrotational fins.

It should be noted that the design concepts contained herein are not restricted to models, but are applicable to full sized aircraft, with some possible advantages over conventional helicopters. In particular, the relatively large undersurface of the present design provides a safety feature in the event of rotor failure in that this surface would serve to slow the rate of descent to a safe level by gliding.

Having described the invention, I claim:
1. A flying saucer model, comprising:
    (a) a generally disc shaped body normally positioned to place the transverse axes in the horizontal plane,
    (b) a first generally annular passageway passing vertically through the body,
    (c) a thrust generating device smaller than and located within the passageway to produce a downward flow in the passageway, (d) first mounting means to secure the thrust generating device to said body, said first mounting means having openings to permit air to flow through said first passageway about the thrust generating device, and through the openings in the first mounting means, (e) a first gyroscopic rotor comprising a hub, spokes and a rim, said spokes being fin-shaped, said rotor being positioned within the first passageway below the first thrust generating device with its transverse axes in the horizontal plane, the fin shaped spokes being set at an angle to cause the rotor to rotate when subject to the downward flow of air from the first thrust generating device, (f) second mounting means to rotatably mount the rotor at its hub to the body, said second mounting means having openings to permit air to pass through the first passageway, and wherein the first passageway is centrally located within the body, the first thrust generating device is formed by the combination of a propeller and a reciprocating engine with a throttle and an engine shaft, the engine shaft being connected to and driving the propeller, and the combination being positioned in the passageway to produce a downward flow of air within the first passageway, and further comprising a countertorque tube mounted to said body and placed within the path of the downward flow in the first passageway to counteract the torque produced by the reciprocating engine and prevent rotation of the body, the tube comprising a hollow shaft bent to orient an exhaust port, formed of the one end of the shaft, in a position generally orthogonal to an input port, formed of the opposite end of the shaft, the shaft having an open face along a portion near the input port that exposes the hollow interior to serve as a means of capturing the down flow and channeling it into the tube for expulsion from the exhaust port in a direction which will provide a counterrotational torque.

2. A model as claimed in claim 1, further comprising first pivot means connecting the countertorque tube to the body of the craft to permit rotation of the tube and thus a change in the amount of countertorque produced by changing the direction of the exhaust from the tube.

3. A model as claimed in claim 2, further comprising a fine torque adjustment fin and a second pivot means, the second pivot means connecting the fine torque adjustment fin to an edge of the exhaust port of the countertorque tube to permit the fin to deflect the exhaust flow from the exhaust port and thereby adjust the degree of counterrotational torque produced by the tube.

4. A model as claimed in claim 1, further comprising a separator formed of a thin wall cylinder placed within and generally concentrically aligned with the first passageway, the separator being positioned between the countertorque tube and the main downflow within the passageway to reduce the disturbance to the downflow caused by the countertorque tube.

5. A model as claimed in claim 4, wherein the countertorque tube is connected to the side wall of the first passageway and the separator is positioned adjacent the countertorque tube to provide minimum obstruction to the downward flow.

* * * * *